(12) United States Patent
Asayag et al.

(10) Patent No.: US 11,467,886 B2
(45) Date of Patent: Oct. 11, 2022

(54) MIGRATING VIRTUAL MACHINES BETWEEN COMPUTING ENVIRONMENTS

(71) Applicant: Red Hat, Inc., Raleigh, NC (US)

(72) Inventors: Mordechay Asayag, Netanya (IL); Arik Hadas, Herzliya (IL)

(73) Assignee: RED HAT, INC., Raleigh, NC (US)

( * ) Notice: Subject to any disclaimer, the term of this patent is extended or adjusted under 35 U.S.C. 154(b) by 219 days.

(21) Appl. No.: 16/867,167

(22) Filed: May 5, 2020

(65) Prior Publication Data
US 2021/0349767 A1    Nov. 11, 2021

(51) Int. Cl.
*G06F 9/50* (2006.01)
*G06F 9/455* (2018.01)
*G06F 11/20* (2006.01)

(52) U.S. Cl.
CPC ........ G06F 9/5088 (2013.01); G06F 9/45558 (2013.01); G06F 9/5077 (2013.01); G06F 11/203 (2013.01); *G06F 2009/4557* (2013.01); *G06F 2201/815* (2013.01)

(58) Field of Classification Search
CPC .. G06F 9/5088; G06F 9/45558; G06F 9/5077; G06F 11/203; G06F 2009/4557; G06F 2201/815
See application file for complete search history.

(56) References Cited

U.S. PATENT DOCUMENTS

| | | | |
|---|---|---|---|
| 8,280,974 B2 | 10/2012 | Herington | |
| 9,377,963 B2 | 6/2016 | Colbert et al. | |
| 9,575,797 B2 * | 2/2017 | Linton | G06F 9/45558 |
| 10,146,594 B2 | 12/2018 | Chao et al. | |
| 10,404,579 B1 * | 9/2019 | Biemueller | H04L 61/2084 |
| 2009/0150463 A1 | 6/2009 | Sekiguchi et al. | |

(Continued)

OTHER PUBLICATIONS

DirectedSoul, "Howto import VM into KubeVirt", kubevirt.io/2019/How-To-Import-VM-into-Kubevirt.html, Jul. 29, 2019 (Year: 2019).*

(Continued)

*Primary Examiner* — Lewis A Bullock, Jr.
*Assistant Examiner* — Kevin X Lu
(74) *Attorney, Agent, or Firm* — Kilpatrick Townsend & Stockton LLP

(57) ABSTRACT

Virtual machines can be migrated between computing environments. For example, a system can receive a request to perform a migration process involving migrating a virtual machine from a source computing environment to a target computing environment. The target computing environment may be a cloud computing environment. In response to the request, the system can receive first configuration data for a first version of the virtual machine that is located in the source computing environment. The first configuration data can describe virtualized features of the first version of the virtual machine. The system can use the first configuration data to generate second configuration data for a second version of the virtual machine that is to be deployed in the target computing environment. The system can then deploy the second version of the virtual machine within one or more containers of the target computing environment in accordance with the second configuration data.

20 Claims, 3 Drawing Sheets

(56) References Cited

U.S. PATENT DOCUMENTS

| | | | | |
|---|---|---|---|---|
| 2012/0304176 A1* | 11/2012 | Takeda | ................. | G06F 9/4856 |
| | | | | 718/1 |
| 2014/0115161 A1* | 4/2014 | Agarwal | ................ | H04L 41/18 |
| | | | | 709/226 |
| 2017/0093918 A1* | 3/2017 | Banerjee | ................ | H04L 63/20 |
| 2018/0088935 A1* | 3/2018 | Church | ............... | G06F 11/3051 |
| 2019/0208005 A1* | 7/2019 | Gadalin | ................. | H04L 67/10 |
| 2019/0324786 A1* | 10/2019 | Ranjan | ................ | G06F 9/45558 |
| 2020/0034167 A1* | 1/2020 | Parthasarathy | ........... | G06F 8/65 |

OTHER PUBLICATIONS

Bryant, D., "Part 3: Incremental App Migration from VMs to Kubernetes—Routing Traffic with a Service Mesh," Jul. 25, 2019, https://blog.getambassador.io/part-3-incremental-app-migration-from-vms-to-kubernetes-ambassador-and-consul-aacf87eea3e8.

Loo, H., et al., "Live Pod Migration in Kubernetes," 2018, https://www.cs.ubc.ca/~bestchai/teaching/cs416_2018w1/project2/project_m6r8_s8u8_v5v8_y6x8_proposal.pdf.

Salfner, F., et al., "Downtime Analysis of Virtual Machine Live Migration," Department of Computer Science Humboldt-Universitat zu Berlin, Germany; Operating Systems and Middleware Group Hasso-Plattner-Institute at University Potsdam, Germany, 2011, https://citemaster.net/get/4603ab00-286f-11ea-a695-00163e009cc7/salfner11downtime.pdf.

* cited by examiner

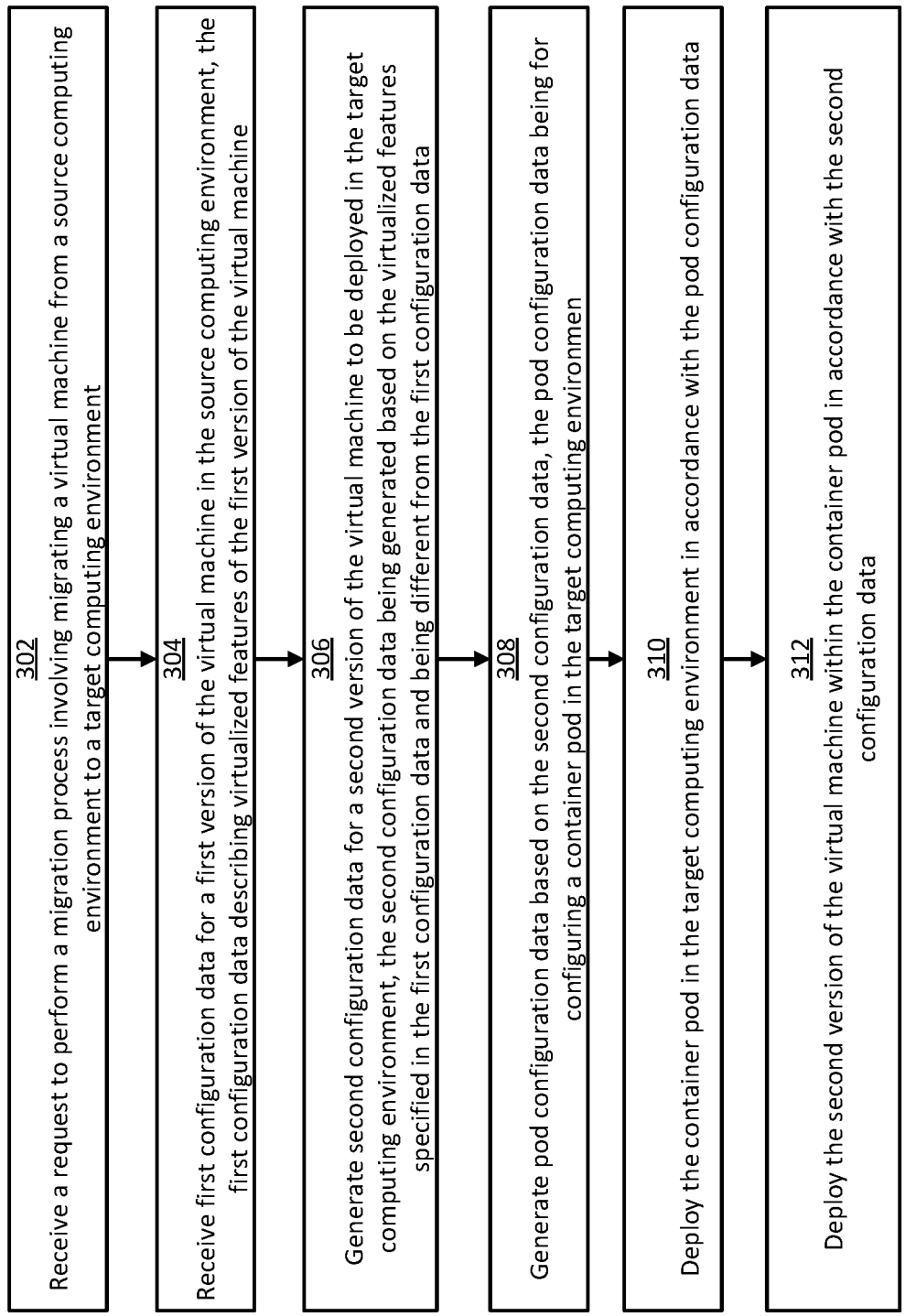

MIGRATING VIRTUAL MACHINES BETWEEN COMPUTING ENVIRONMENTS

TECHNICAL FIELD

The present disclosure relates generally to migrating a virtual machine between computing environments. More specifically, but not by way of limitation, this disclosure relates to migrating a virtual machine from a source computing environment to a target computing environment.

BACKGROUND

Virtual machines are one popular mechanism for deploying isolated computing environments on a computer system. A virtual machine is an emulation (virtualization) of an actual physical computer system. Virtual machines include virtualized hardware and guest system software, such as a guest operating system and one or more applications. The virtualized hardware can emulate corresponding physical components, such as central processing units (CPUs), random access memory (RAM), network interfaces, and storage, that exist in a physical computer system. Virtual machines are generally deployed as guests on a host operating system using virtualization software, such as a hypervisor.

Containers are another popular mechanism for deploying isolated computing environments on a computer system. A container is a relatively isolated virtual environment that is generated by leveraging the resource isolation features of the Linux kernel (e.g., cgroups and namespaces). In some cases, one or more containers can be incorporated into a container pod, which is a higher level abstraction of a grouping of containerized components. Container pods typically share resources and may be co-located on the same host machine.

BRIEF DESCRIPTION OF THE DRAWINGS

FIG. 3 a flow chart of an example of a process for migrating virtual machines between computing environments according to some aspects of the present disclosure.

DETAILED DESCRIPTION

Figure 1:
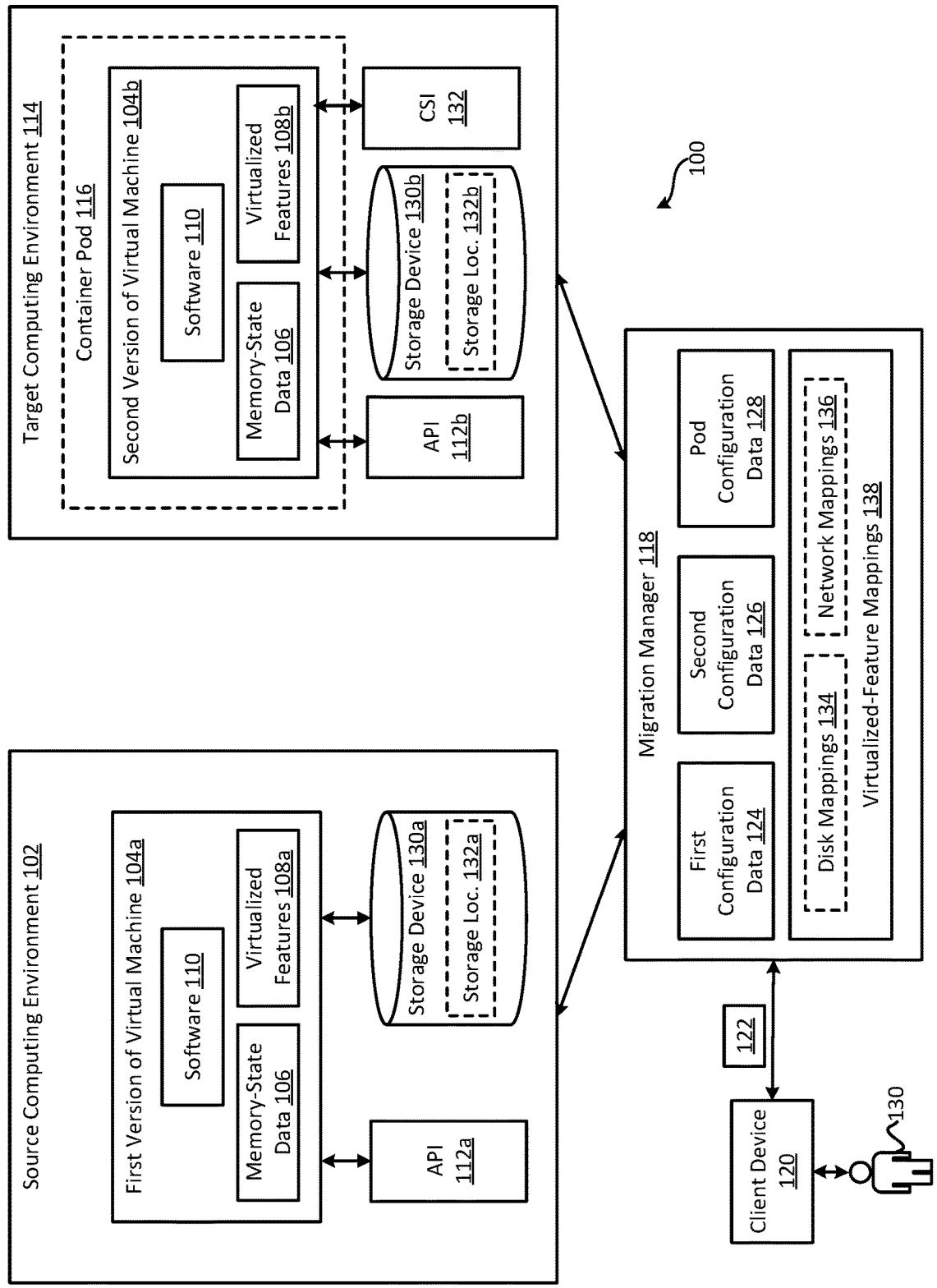
FIG. 1 is a block diagram of an example of a system for migrating virtual machines between computing environments according to some aspects of the present disclosure.

Cloud computing environments have improved flexibility, reliability, and affordability over traditional computing environments that many system administrators may wish to leverage. To that end, system administrators may try to migrate computing workloads from their traditional computing environments (e.g., their on-premises computing environments) to cloud computing environments. But these workloads often involve the use of virtual machines, which can require a significant amount of time and manual labor to migrate. And many cloud platforms like Kubernetes are designed primarily or solely for containers, making virtual-machine deployments thereon difficult or suboptimal.

Some aspects and features of the present disclosure can overcome one or more of the abovementioned problems by automatically migrating a virtual machine from a source computing environment that is not a cloud computing environment to a target computing environment that is a cloud computing environment, in order to leverage the many benefits of the cloud. For example, a virtual machine can be automatically migrated from an on-premises datacenter to a cloud computing environment to take advantage of various improvements to scaling, reliability, and affordability provided by cloud computing architectures. And since many cloud platforms are designed primarily or solely for use with containers, in some examples the virtual machine can be deployed within one or more containers in the target computing environment. For example, part of the migration process can involve deploying the virtual machine inside a container pod of the target computing environment. Deploying the virtual machine inside one or more containers can avoid compatibility issues, such as those that could arise if attempting to deploy a virtual machine directly on a cloud platform that is designed primarily for containers. Deploying the virtual machine inside one or more containers can also maintain the benefits of using virtual machines (e.g., the ability to run a guest operating system that is different from the underlying host operating system) that may not be otherwise obtainable solely by using containers.

In some examples, the migration process can be a live migration process in which a first version of the virtual machine is kept running on the source computing environment throughout some or all of the migration process. This can reduce the amount of downtime associated with the migration process, which in turn can reduce disruptions perceived by users.

As one particular example, a system of the present disclosure can receive a request to perform a migration process involving migrating a virtual machine from a source computing environment to a target computing environment, which may be a cloud computing environment. In response to the request, the system can retrieve first configuration data for a first version of the virtual machine located in the source computing environment. The first configuration data can describe virtualized features of the first version of the virtual machine. The system can use the first configuration data to generate second configuration data for a second version of the virtual machine that is to be deployed to the target computing environment. The second configuration data can be generated based on the virtualized features specified in the first configuration data, in an effort to ensure that some or all of the virtualized features of the first version of the virtual machine are carried through to the second version of the virtual machine. In some examples, the system can further use the second configuration data to generate pod configuration data, which the system can use to deploy the container pod in the target computing environment. Finally, the system can deploy the second version of the virtual machine within the container pod in accordance with the second configuration data. In this way, the system can automatically migrate the virtual machine from the source computing environment to within a container pod of the target computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 migrating virtual machines between computing environments. The system 100 includes a source computing environment 102 and a target computing environment 114. The source computing environment 102 is separate from the target computing environment 114 and has at least one hardware or software characteristic that is different from the target computing environment 114. For example, the source computing environment 102 may not be a cloud computing environment (e.g., may be on-premises) whereas the target computing may be a cloud computing environment. Additionally or alternatively, the source computing environment 102 may lack a container-orchestration system such as Kubernetes whereas the target computing environment 114 may include a container-orchestration system. In some examples, the source computing environment 102 may lack containerization capabilities (the ability to deploy containers) altogether whereas the target computing environment 114 has containerization capabilities.

A user 130 may wish to migrate a virtual machine (VM) from the source computing environment 102 to the target computing environment 114 to leverage one or more benefits afforded by the target computing environment 114. Migrating a virtual machine from the source computing environment 102 to the target computing environment 114 can involve two phases, a setup phase and a memory-state migration phase. Although the setup and memory-state migration phases are described sequentially below for simplicity, other examples may involve aspects of these phases occurring concurrently. In some examples, aspects of these phases can be implemented while the virtual machine is live—that is, while the virtual machine is still running in the source computing environment 102. Implementing aspects of these phases while the virtual machine is live can be referred to as a live migration process. The live migration processes can minimize disruptions with the functionality of the virtual machine, particularly disruptions that are perceptible by users.

The setup phase can generally involve identifying a first version of the virtual machine 104a in the source computing environment 102 and deploying a second version of the virtual machine 104b in the target computing environment 114. In some examples, the first version of the virtual machine 104a is not deployed inside a container in the source computing environment 102, whereas the second version of the virtual machine 104b is deployed inside at least one container in the target computing environment 114. In some examples, the second version of the virtual machine 104b can be deployed across a group of containers and/or inside a container pod 116.

During the setup phase, the second version of the virtual machine 104b can be configured to have one or more virtualized features 108b that are similar to the virtualize features 108a of the first version of the virtual machine 104a. Examples of such virtualized features can include virtualized hardware, such as virtual processors (e.g., a vCPU), virtual memory (e.g., vRAM), virtual disks, and virtual networks; guest system software, such as a guest operating system and drivers; or any combination of these. A virtual disk appears as a physical disk drive to the guest operating system. Synchronizing the virtual features 108a-b can reduce compatibility problems encountered by software 110 executing within the context of the virtual machine, such as software applications executing on the guest operating system and within the isolated environment of the virtual machine.

The memory-state migration phase can generally involve transferring memory-state data 106 from the source computing environment 102 to the target computing environment 114. Memory-state data 106 is information describing a memory state (e.g., a volatile memory state) of the virtual machine 104a during runtime. An example of the memory-state data 106 can include information stored in a virtual memory (vRAM) of a virtual machine during runtime. Transferring the memory-state data 106 during the memory-state migration phase can enable execution of the software 110 to pick up in the target computing environment 114 from where it left off in the source computing environment 102, providing a relatively seamless transition between the two computing environments.

To assist with performing such migrations, the system 100 includes a migration manager 118. The migration manager 118 can include one or more computing nodes ("nodes") such as servers. Although the migration manager 118 is shown in FIG. 1 as being separate from the source computing environment 102 and the target computing environment 114, in other examples the migration manager 118 may be part of the source computing environment 102 or the target computing environment 114. Regardless of its location, the migration manager 118 can communicate (e.g., via one or more networks) with the source computing environment 102 and/or the target computing environment 114 to serve as an orchestrator in the migration process.

In particular, the migration manager 118 can receive a request 122 from a client device 120 operable by the user 130. Examples of the client device 120 can include a laptop computer, desktop computer, or mobile phone. The request 122 can be for performing a migration process involving migrating a virtual machine from the source computing environment 102 to the target computing environment 114. The migration manager 118 can receive the request 122 and respond to the request by executing some or all of the migration process, as described in further detail below.

The migration manager 118 can begin the migration process by receiving first configuration data 124 corresponding to the first version of the virtual machine 104a from the source computing environment 102. The first configuration data 124 can describe a configuration state of the first version of the virtual machine 104a in the source computing environment 102. For example, the first configuration data 124 can describe a runtime configuration state of the first version of the virtual machine 104a, including the virtualized features 108a present at runtime. The first configuration data 124 can also include other configuration information about the first version of the virtual machine 104a, such as a name of the first version of the virtual machine 104a in the source computing environment 102, a user identifier (UID) for the first version of the virtual machine 104a in the source computing environment 102, and availability information for the first version of the virtual machine 104a.

In some examples, the migration manager 118 can receive the first configuration data 124 from the source computing environment 102 by interacting with an application programming interface (API) 112a of the source computing environment 102, where the API 112a may be a RESTful API or another type of API. For instance, the migration manager 118 can transmit one or more commands to the API 112a for retrieving the first configuration data 124. The source computing environment 102 can receive the one or more commands via the API 112a and responsively determine the first configuration data 124. The source computing environment 102 may determine the first configuration data 124 by interacting with virtualization software, such as a hypervisor, used to provision the first version of the virtual machine 104a in the source computing environment 102. The source computing environment 102 can then provide the first configuration data 124 back to the migration manager 118 via the API 112a.

Based on the first configuration data 124, the migration manager 118 can determine disk properties for a virtual disk used by the first version of the virtual machine 104a for storing content in a storage location 132a of the storage device 130a. The virtual disk can be referred to as a source virtual disk, since it is located in the source computing environment 102. One example of a disk property can include a virtual input/output (I/O) interface used by the first version of the virtual machine 104a to interact with the source virtual disk. Another example of a disk property can include a name of the source virtual disk. Yet another example of a disk property can be a storage location 132a on a storage device 130a associated with the virtual disk. The migration manager 118 may determine the disk properties by extracting them from the first configuration data 124.

Based on the disk properties of the source virtual disk, the migration manager 118 can provide the target computing environment 114 with access to the content of the source virtual disk. For example, the migration manager 118 can transmit one or more commands to an API 112b of the target computing environment 114. The target computing environment 114 can respond to the one or more commands by executing a container storage interface 132. The container storage interface 132 can interact with the storage device 130a of the source computing environment 102 to provide the target computing environment 114 with access to the content using one or more of the following approaches.

In one exemplary approach, the container storage interface 132 can mount the storage location 132a containing the content as another virtual disk on one or more nodes (e.g., servers) of the target computing environment 114, such as the particular nodes that are to run the container pod 116. This other virtual disk can be referred to as a target virtual disk, since it is located in the target computing environment 114. For instance, the storage location 132a may be mounted as Virtual Disk X in the source computing environment 102 and as Virtual Disk Y in the target computing environment 114, where both of these virtual disks relate to the same storage location 132a containing the same content. This can make the content associated with the source virtual disk available in the target computing environment 114 via the target virtual disk. In another exemplary approach, the container storage interface 132 can execute a storage-migration process in which the content of the storage location 132a is copied to another storage location 132b of another storage device 130b associated with the target computing environment 114. The storage-migration process could be a live storage-migration process in which the content is copied from the storage location 132a to the other storage location 132b while the first version of the virtual machine 104a is still running. The storage location 132b can also be mounted as a target virtual disk on one or more nodes of the target computing environment 114, thereby making the content available in the target computing environment 114 once it is copied to the storage location 132b. Using either of the above approaches, the migration manager 118 can generate a disk mapping 134 that correlates the source virtual disk to the target virtual disk. For example, the disk mapping 134 can correlate Virtual Disk X of the source computing environment 102 to Virtual Disk Y of the target computing environment 114. The above processes can be repeated for any number of source virtual disks to make their content accessible through corresponding virtual disks in the target computing environment 114 and to generate associated disk mappings 134.

In some examples, the migration manager 118 can also determine network properties describing a virtual network used by the first version of the virtual machine 104a to transmit data to one or more other targets (e.g., virtual machines or console client applications). Examples of network properties can include a name of the virtual network, a type (e.g., NAT, bridged, and host-only) of the virtual network, whether DHCP is enabled on the virtual network, a subnet address for the virtual network, a subnet mask for the virtual network, port forwarding information for the virtual network, and a virtual network interface for interacting with the virtual network. The migration manager 118 may determine the network properties by extracting them from the first configuration data 124.

The migration manager 118 can generate a network mapping 136 based on the network properties of the virtual network. A network mapping 136 is a correlation between two virtual networks. For example, the migration manager 118 can generate a network mapping 136 indicating a correlation between (i) the virtual network used by the first version of the virtual machine 104a and (ii) another virtual network of the target computing environment 114. The virtual network used by the first version of the virtual machine 104a can be referred to as a source virtual network, since it is located in the source computing environment 102. And the virtual network located in the target computing environment 114 can be referred to as a target virtual network. Thus, the migration manager 118 can determine a network mapping 136 between the source virtual network and the target virtual network.

As one particular example, the first version of the virtual machine 104a may use a source virtual network having the following network properties: {name—VMnet8, type—NAT, DHCP—enabled, subnet address—192.168.65.0}. And the target computing environment 114 can include a target virtual network having the following network properties: {name—net8, type—NAT, DHCP—enabled, subnet address—192.168.65.1}. The migration manager 118 can determine that these two virtual networks correspond to one another using one or more approaches. One exemplary approach can involve the migration manager 118 analyzing the network properties of both virtual networks to determine if some or all of their network properties sufficiently match (e.g., match within a predefined tolerance amount) one another. For instance, the migration manager 118 may determine that the name "net8" is sufficiently close to the name "VMnet8" to constitute a match. When considered in conjunction with the fact that both virtual networks are of the same type and their DHCP configurations also match, the migration manager 118 may determine that these two virtual networks are correlated and generate a network mapping 136 indicating that correlation. Of course, this is just one example and other examples may involve matching more or fewer network properties with a greater or lesser degree of tolerance. Another exemplary approach can involve receiving a network mapping 136 correlating the source virtual network to the target virtual network as manual input from a user, such as user 130. But regardless of the approach, any number of network mappings 136 can be generated for any number of source and target virtual networks.

The above processes described in reference to virtual disks and virtual networks may also be applied for other virtualized features associated with the first version of the virtual machine 104a. This may yield additional virtualized-feature mappings 138 that correlate source virtualized features associated with the first version of the virtual machine 104a to target virtualized features associated with the target computing environment 114.

Next, the migration manager 118 can generate second configuration data 126 for use in deploying the second version of the virtual machine 104b in the target computing environment 114. The migration manager 118 can generate the second configuration data 126 based on the first configuration data 124. For example, the migration manager 118 can generate the second configuration data 126 based on the disk mappings 134, which may be derived by using the first configuration data 124. The migration manager 118 can additionally or alternatively generate the second configuration data 126 based on the network mappings 136, which may also be derived by using the first configuration data 124. Additionally or alternatively, the migration manager 118 can generate the second configuration data 126 based on other virtualized-feature mappings 138, which may also be derived by using the first configuration data 124. The migration manager 118 can generate the second configuration data 126 using any suitable process.

For example, the migration manager 118 can generate the second configuration data 126 by making a copy of the first configuration data 124. The migration manager 118 can then replace some or all instances of source virtual disk names in the copy with their corresponding target virtual disk names, based on the disk mappings 134. For example, the migration manager 118 can replace every instance of Virtual Disk X in the copy with the name of its corresponding target virtual disk, Virtual Disk Y, according to the disk mappings 134. The migration manager 118 can additionally or alternatively perform a similar process for the virtual networks in the copy using the network mappings 136. In particular, the migration manager 118 can replace some or all instances of source virtual network names in the copy with their corresponding target virtual network names, based on the network mappings 136. For example, the migration manager 118 can replace every instance of Virtual Network X in the copy with the name of its corresponding target virtual network, Virtual Network Y, according to the network mappings 136. The migration manager 118 can also perform a similar process for other virtualized features described in the copy using other virtualized-feature mappings 138. At the end of this process, the copy can serve as the second configuration data 126. Of course, the migration manager 118 can alternatively generate the second configuration data 1126 using other suitable approaches.

Based on the second configuration data 126, the migration manager 118 can generate pod configuration data 128. The migration manager 118 can generate pod configuration data 128 that assigns the target virtual disks, target virtual networks, and other computing resources specified in the second configuration data 126 to the container pod 116. For example, the migration manager 118 may extract the property values that are applicable to container pods from the second configuration data 126, and use those property values to generate the pod configuration data 128. The migration manager 118 may also include predefined property values in the pod configuration data 128. This can provide the container pod 116 with the computing resources (e.g., memory, virtual disks, and virtual networks) needed to run the second version of the virtual machine 104b thereon. As one particular example, the second configuration data 126 can indicate that the second version of the virtual machine 104b is to have 8 megabytes (MB) of memory. The migration manager 118 can extract this information from the second configuration data 126, determine that the container pod 116 is also to have 8 MB of memory, and set a memory-size property value in the pod configuration data 128 to 8 MB.

The migration manager 118 can deploy the container pod 116 on one or more nodes of the target computing environment 114 in accordance with the pod configuration data 128. For example, the migration manager 118 can interact with the API 112b of the target computing environment 114 for causing the target computing environment 114 to start the container pod 116 on the one or more nodes and configure the container pod 116 in accordance with the pod configuration data 128. In some examples, deploying the container pod 116 in accordance with the pod configuration data 128 may involve mounting the target virtual disks to the container pod 116 to enable the container pod 116 to have access to the content of those virtual disks. Additionally or alternatively, deploying the container pod 116 in accordance with the pod configuration data 128 may involve coupling the target virtual networks to the container pod 116 to enable the container pod 116 to have access to the target virtual networks.

Once the container pod 116 is deployed, the migration manager 118 can then deploy the second version of the virtual machine 104b inside the container pod 116 in accordance with the second configuration data 126. The migration manager 118 can deploy (directly or indirectly) the second version of the virtual machine 104b inside the container pod 116 using any suitable approach. For example, the migration manager 118 can interact with the API 112a of the source computing environment 102 for causing a source hypervisor of the source computing environment 102 to deploy the virtual machine 104b in accordance with the second configuration data 126 inside the container pod 116. In one such example, the migration manager 118 can provide the API 112a with the second configuration data 126 for causing the source hypervisor to initiate the second version of the virtual machine 104b in the container pod 116 in accordance with the second configuration data 126. As another example, the migration manager 118 can interact with the API 112b of the target computing environment 114 for causing the target computing environment 114 to deploy the second version of the virtual machine 104b in accordance with the second configuration data 126 inside the container pod 116. Regardless of the approach, deploying the second version of the virtual machine 104b in accordance with the second configuration data 126 may involve mounting the target virtual disks to the second version of the virtual machine 104b to enable the second version of the virtual machine 104b to have access to the more persistent content of those virtual disks. Additionally or alternatively, deploying the second version of the virtual machine 104b in accordance with the pod configuration data 128 may involve coupling the target virtual networks to the second version of the virtual machine 104b to enable the second version of the virtual machine 104b to have access to the target virtual networks. After deploying the second version of the virtual machine 104b, the setup phase of the migration may be complete.

The migration manager 118 may also perform a memory-state migration phase of the migration process, in order to transfer the less persistent (e.g., more volatile) memory-state data 106 to the second version of the virtual machine 104b. The memory-state migration phase may be performed before, after, or concurrently with the setup phase. The migration manager 118 may effectuate the memory-state migration phase by interacting with one or both of the APIs 112a-b. For example, the migration manager 118 can interact with one or both of the APIs 112a-b to establish a communication pathway from the source computing environment 102 to the container pod 116 inside the target computing environment 114. The communication pathway may or may not exclude the migration manager 118. The source computing environment 102 can then transmit the memory-state data 106 to the container pod 116 via the communication pathway. The data can then be stored in the storage device 130b. It will be appreciated that the memory-state migration phase can be a live memory-state migration phase in some examples, in which at least some of the memory-state data 106 is copied from the source computing environment 102 to the target computing environment 114 while the first version of the virtual machine 104a is still running.

If the setup and memory-state migration phases complete successfully, a handoff can occur in which the first version of the virtual machine 104a is stopped and the second version of the virtual machine 104b takes over. For example, the first version of the virtual machine 104a can be removed from the source computing environment 102 and the second version of the virtual machine 104b can take over execution of the software 110, such that the second version of the virtual machine 104b responds to all future requests associated with the software 110. The handoff can be substantially instantaneous to minimize downtime. The handoff may complete the migration process.

If the migration process fails, the migration manager 118 can detect the failure and respond accordingly. For example, the migration manager 118 can detect a failure event. A failure event is any event indicating that the migration process has failed or is going to fail. The migration manager 118 may detect the failure event by interacting with one or both APIs 112a-b, which may provide status information related to the migration process. For example, the APIs 112a-b may provide status information about the deployment of the container pod 116, the deployment of the second version of the virtual machine 104b inside the container pod 116, the memory-state data 106 transfer associated with the memory-state migration phase, or any combination of these. The migration manager 118 can determine that the status information indicates a failure of at least one aspect of the migration process and consequently determine that a failure event has occurred.

In response to detecting the failure event, the migration manager 118 may notify the user 130 by transmitting a failure notification to the client device 120. The migration manager 118 can also execute one or more cleanup operations. The cleanup operations can free up computing resources associated with the failed migration process in the target computing environment 114. For example, the migration manager 118 can stop running the container pod 116, unmount some or all of the target virtual disks from the container pod 116, and remove the container pod 116 from the target computing environment 114. The migration manager 118 may execute some or all of these cleanup operations by interacting with the API 112b. For example, the migration manager 118 can stop running the container pod 116 by transmitting a command to the API 112b for causing the target computing environment 114 to stop running the container pod 116. Likewise, the migration manager 118 can unmount some or all of the target virtual disks from the container pod 116 by transmitting a command to the API 112b for causing the target computing environment 114 to unmount some or all of the target virtual disks. And so on.

In some examples, the migration process is reversible in the sense that the virtual machine can be selectively migrated from the target computing environment 114 back to the source computing environment 102. This may involve performing at least some of the abovementioned operations in a reverse order. For example, the migration manager 118 can implement a reverse setup phase in which the first version of the virtual machine 104a is deployed in the source computing environment 102 in accordance with the first configuration data 124, which the migration manager 118 had previously obtained and stored. If the migration manager 118 no longer has access to the first configuration data 124 (e.g., because it deleted the first configuration data 124 to conserve memory), then the migration manager 118 can generate the first configuration data 124 based on the second configuration data 126. For example, the migration manager 118 can generate the first configuration data 124 by using a reverse of the process used to generate the second configuration data 126. The migration manager 118 can then deploy the first version of the virtual machine 104a in accordance with the first configuration data 124. In some examples, the migration manager 118 can also implement a reverse memory-state migration phase in which at least some memory-state data 106 is provided from the target computing environment 114 back to the source computing environment 102. The migration manager 118 can implement one or both of these phases by interacting with one or both of the APIs 112a-b, in some examples.

In some examples, the migration manager 118 can automatically execute the abovementioned reverse-migration process in response to determining that one or more performance characteristics of the second version of the virtual machine 104b are unsatisfactory. For example, the migration manager 118 can determine that a latency amount associated with the second version of the virtual machine 104b exceeds a predefined threshold level, or that a response time of the software 110 is below a predefined threshold level. Based on making this determination, the migration manager 118 can automatically execute a reverse-migration process that transfers the virtual machine back to the source computing environment 102. In this way, the virtual machine can be automatically transferred back to the source computing environment 102 in response to determining that any number and combination of performance characteristics associated with the second version of the virtual machine 104b fail to satisfy any number and combination of predefined criteria.

Although FIG. 1 depicts a certain number and arrangement of components, other examples may involve more components, fewer components, different components, or a different arrangement of the components shown in FIG. 1. Additionally, each component depicted in FIG. 1 can represent one or more components. For example, storage device 130a can include one or more storage devices, storage device 130b can include one or more storage devices, storage location 132a can include one or more storage locations, storage location 132b can include one or more storage locations, and so on. Additionally, the migration manager 118 may implement more operations, fewer operations, different operations, or a different order of the operations than described above. For example, the migration manager 118 may not generate the pod configuration data 128 in some cases. It is further noted that although some operations are described herein with reference to a container pod, other examples can be implemented using one or more containers that are not in a pod configuration. For example, similar processes can be applied to deploy the second version of the virtual machine 104b on a single container.

Figure 2:
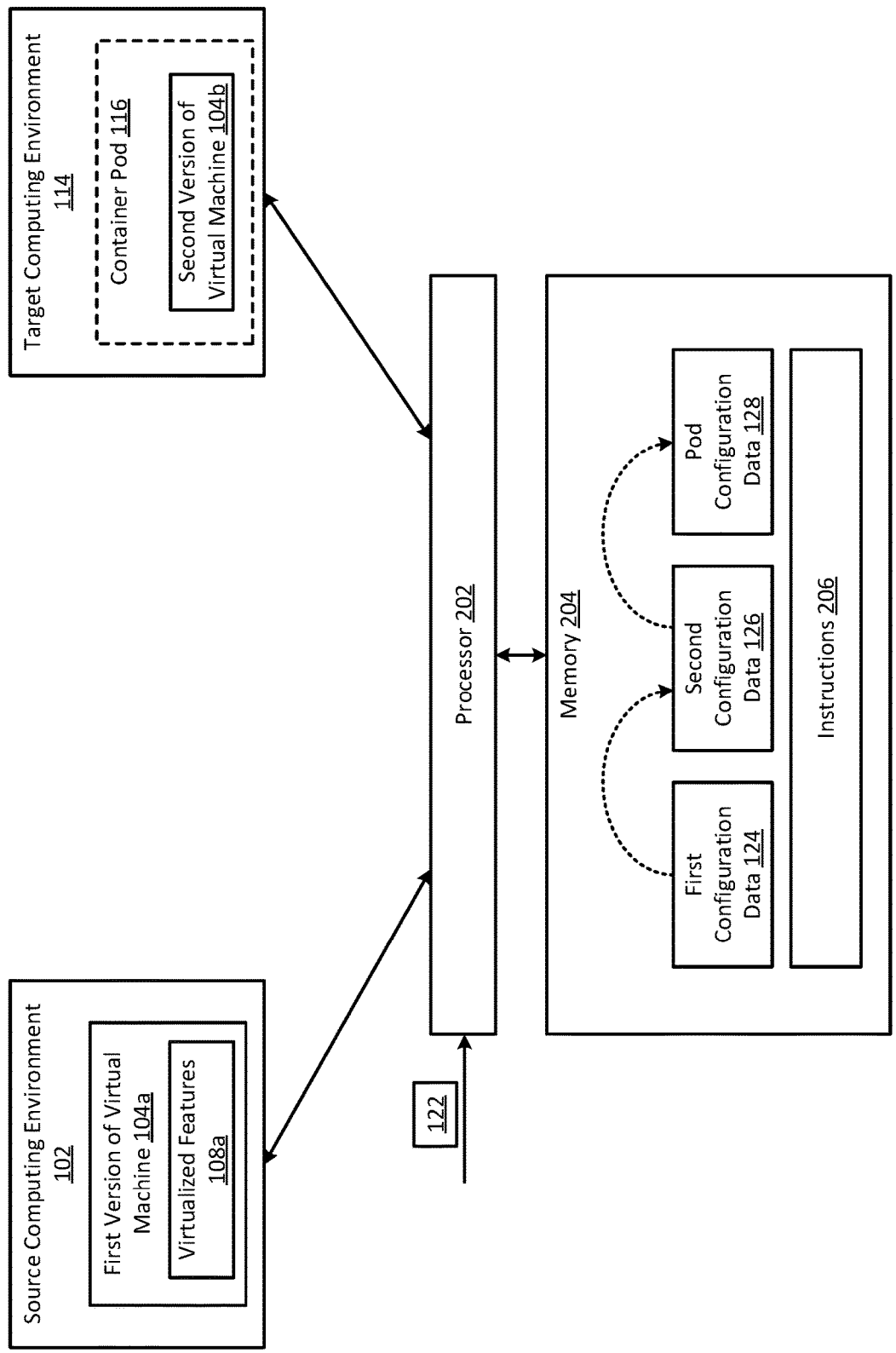
FIG. 2 is a block diagram of another example of a system for migrating virtual machines between computing environments according to some aspects of the present disclosure.

FIG. 2 is a block diagram of another example of a system for migrating virtual machines between computing environments according to some aspects of the present disclosure. The system 200 includes a processor 202 communicatively coupled to a memory 204. The processor 202 and the memory 204 may be located in a common housing or distributed from one another. In some examples, the processor 202 and the memory 204 may be parts of the migration manager 118 of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium. A non-transitory computer-readable medium can include electronic, optical, magnetic, or other storage devices capable of providing the processor 202 with the instructions 206 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 206.

In some examples, the processor 202 can receive a request 122 to perform a migration process involving migrating a virtual machine from a source computing environment 102 to a target computing environment 114. In response to the request 122, the processor 202 can receive first configuration data 124 for a first version of the virtual machine 104a located in the source computing environment 102. The first configuration data 124 can describe virtualized features 108a of the first version of the virtual machine 104a. The processor 202 can then generate second configuration data 126 for a second version of the virtual machine 104b that is to be deployed in the target computing environment 114. The second configuration data 126 can be generated based on the virtualized features 108a specified in the first configuration data 124. The second configuration data 126 can be different from the first configuration data 124. In some examples, the processor 202 can also generate pod configuration data 128 based on the second configuration data 126. The pod configuration data 128 is for configuring a container pod 116 in the target computing environment 114.

After generating the pod configuration data 128, the processor 202 can deploy the container pod 116 in the target computing environment 114. The processor 202 may deploy the container pod 116 by interacting with an API of the target computing environment 114. The processor 202 can deploy the container pod 116 in the target computing environment 114 in accordance with the pod configuration data 128.

The processor 202 can also deploy the second version of the virtual machine 104b in the container pod 116. The processor 202 can deploy the second version of the virtual machine 104b by interacting with an API of the target computing environment 114. The processor 202 can deploy the second version of the virtual machine 104b in accordance with the second configuration data 126.

FIG. 3 a flow chart of an example of a process for migrating virtual machines between computing environments according to some aspects of the present disclosure. While FIG. 3 depicts a certain sequence of operations for illustrative purposes, other examples can involve more operations, fewer operations, different operations, or a different order of the operations than is depicted in FIG. 3. The steps of FIG. 3 are described below with reference to components of FIG. 2.

In block 302, the processor 202 receives a request 122 to perform a migration process involving migrating a virtual machine from a source computing environment 102 to a target computing environment 114. The processor 202 can receive the request from a client device of a user, such as a system administrator or developer.

In block 304, the processor 202 receives first configuration data 124 for a first version of the virtual machine 104a located in the source computing environment 102. The first configuration data 124 can describe virtualized features 108a of the first version of the virtual machine 104a. In some examples, the processor 202 can retrieve the first configuration data 124 from the source computing environment 102 by interacting with an API of the source computing environment 102, or by otherwise interacting with the source computing environment 102.

In block 306, the processor 202 generates second configuration data 126 for a second version of the virtual machine 104b that is to be deployed in the target computing environment 114. The second configuration data 126 can be generated based on the first configuration data 124, for example based on the virtualized features 108a specified in the first configuration data 124. The second configuration data 126 can be different from the first configuration data 124.

In block 308, the processor 202 generates pod configuration data 128 based on the second configuration data 126. The pod configuration data 128 can be for configuring a container pod 116 in the target computing environment 114. In some examples, the processor 202 can generate the pod configuration data 128 by extracting a first set of property values from the second configuration data 126 and using the first set of property values to determine a second set of property values for the pod configuration data 128. The processor 202 may also incorporate one or more predefined (e.g., default) property values into the pod configuration data 128.

In block 310, the processor 202 deploys the container pod 116 in the target computing environment 114 in accordance with the pod configuration data 128. The processor 202 may deploy the container pod 116 by interacting with an API of the target computing environment 114, or by otherwise interacting with the target computing environment 114.

In block 312, the processor 202 deploys the second version of the virtual machine 104b in the container pod 116 in accordance with the second configuration data 126. The processor 202 can deploy the second version of the virtual machine 104b by interacting with an API of the target computing environment 114, or by otherwise interacting with the target computing environment 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory including instructions that are executable by the processor for causing the processor to:
   receive a request to perform a migration process involving migrating a virtual machine from a source computing environment to a target computing environment;
   receive first configuration data for a first version of the virtual machine located in the source computing environment, the first configuration data describing virtualized features of the first version of the virtual machine;
   generate second configuration data for a second version of the virtual machine that is to be deployed in the target computing environment, the second configuration data being generated based on the virtualized features specified in the first configuration data, the second configuration data being different from the first configuration data, the second configuration data being generated based on a disk mapping that correlates source virtual disks used by the first version of the virtual machine in the source computing environment to target virtual disks in the target computing environment, and the second configuration data being generated based on a network mapping that correlates source virtual networks used by the first version of the virtual machine in the source computing environment to target virtual networks in the target computing environment;
   generate pod configuration data based on the second configuration data, the pod configuration data being for configuring a container pod in the target computing environment;
   configure and deploy the container pod in the target computing environment in accordance with the pod configuration data, the container pod being configured to have access to the target virtual disks and the target virtual networks; and
   subsequent to the container pod being configured to have access to the target virtual disks and the target virtual networks, configure and deploy the second version of the virtual machine within the container pod in accordance with the second configuration data, the second version of the virtual machine being configured to have access to the target virtual disks and the target virtual networks.

2. The system of claim 1, wherein the virtualized features include a source virtual disk configured for storing content in a storage location of a storage device associated with the source computing environment, and wherein the memory further includes instructions that are executable by the processor for causing the processor to:
   transmit a command configured for causing the target computing environment to mount a target virtual disk having access to the content to the container pod, thereby enabling the container pod to have access to the content.

3. The system of claim 2, wherein the memory further includes instructions that are executable by the processor for causing the processor to generate the second configuration data based on the target virtual disk for enabling the second version of the virtual machine to have access to the content.

4. The system of claim 1, wherein the memory further includes instructions that are executable by the processor for causing the processor to:
   detect a failure event associated with the migration process; and
   in response to detecting the failure event:
   stop running the container pod;
   unmount a virtual disk from the container pod; and
   remove the container pod from the target computing environment.

5. The system of claim 1, wherein the memory further includes instructions that are executable by the processor for causing the processor to:
   execute a reverse migration process based on the first configuration data for migrating the virtual machine back to the source computing environment, the reverse migration process involving re-deploying the first version of the virtual machine in accordance with the first configuration data in the source computing environment.

6. The system of claim 1, wherein the virtualized features include a source virtual network for transmitting data using the first version of the virtual machine in the source computing environment, and the memory further includes instructions that are executable by the processor for causing the processor to:
   determine a correlation between (i) the source virtual network and (ii) a target virtual network of target computing environment; and
   generate the second configuration data based on the correlation.

7. The system of claim 1, wherein the migration process is a live migration process, and the memory further includes instructions that are executable by the processor for causing the processor to migrate memory-state data corresponding to the first version of the virtual machine from the source computing environment to the target computing environment while the first version of the virtual machine is running in the source computing environment.

8. The system of claim 1, wherein the source computing environment is not a cloud computing environment and the target computing environment is a cloud computing environment.

9. A method comprising:
   receiving, by a processor, a request to perform a migration process involving migrating a virtual machine from a source computing environment to a target computing environment;
   receiving, by the processor, first configuration data for a first version of the virtual machine located in the source computing environment, the first configuration data describing virtualized features of the first version of the virtual machine;
   generating, by the processor, second configuration data for a second version of the virtual machine that is to be deployed in the target computing environment, the second configuration data being generated based on the virtualized features specified in the first configuration data, the second configuration data being different from the first configuration data, the second configuration data being generated based on a disk mapping that correlates source virtual disks used by the first version of the virtual machine in the source computing environment to target virtual disks in the target computing environment, and the second configuration data being generated based on a network mapping that correlates source virtual networks used by the first version of the virtual machine in the source computing environment to target virtual networks in the target computing environment;

generating, by the processor, pod configuration data based on the second configuration data, the pod configuration data being for configuring a container pod in the target computing environment;

configuring and deploying, by the processor, the container pod in the target computing environment in accordance with the pod configuration data, the container pod being configured to have access to the target virtual disks and the target virtual networks; and subsequent to the container pod being configured to have access to the target virtual disks and the target virtual networks, configuring and deploying, by the processor, the second version of the virtual machine within the container pod in accordance with the second configuration data, the second version of the virtual machine being configured to have access to the target virtual disks and the target virtual networks.

10. The method of claim 9, wherein the virtualized features include a source virtual disk configured for storing content in a storage location of a storage device associated with the source computing environment, and further comprising transmitting a command for causing the target computing environment to mount a target virtual disk having access to the content to the container pod, thereby enabling the container pod to have access to the content.

11. The method of claim 10, further comprising generating the second configuration data based on the target virtual disk for enabling the second version of the virtual machine to have access to the content.

12. The method of claim 9, further comprising:
detecting a failure event associated with the migration process; and
in response to detecting the failure event:
stopping running the container pod;
unmounting a virtual disk from the container pod; and
removing the container pod from the target computing environment.

13. The method of claim 9, further comprising:
executing a reverse migration process based on the first configuration data for migrating the virtual machine back to the source computing environment, the reverse migration process involving re-deploying the first version of the virtual machine in accordance with the first configuration data in the source computing environment.

14. The method of claim 9, wherein the virtualized features include a source virtual network for transmitting data using the first version of the virtual machine in the source computing environment, and further comprising:
determining a correlation between (i) the source virtual network and (ii) a target virtual network of target computing environment; and
generating the second configuration data based on the correlation.

15. The method of claim 9, further comprising migrating data from the source computing environment to the target computing environment while the first version of the virtual machine is running in the source computing environment.

16. The method of claim 9, wherein the source computing environment is not a cloud computing environment and the target computing environment is a cloud computing environment.

17. A non-transitory computer-readable medium comprising program code that is executable by a processor for causing the processor to:
receive a request to perform a migration process involving migrating a virtual machine from a source computing environment to a target computing environment;
receive first configuration data for a first version of the virtual machine located in the source computing environment, the first configuration data describing virtualized features of the first version of the virtual machine;
generate second configuration data for a second version of the virtual machine that is to be deployed in the target computing environment, the second configuration data being generated based on the virtualized features specified in the first configuration data, the second configuration data being different from the first configuration data, the second configuration data being generated based on a disk mapping that correlates source virtual disks used by the first version of the virtual machine in the source computing environment to target virtual disks in the target computing environment, and the second configuration data being generated based on a network mapping that correlates source virtual networks used by the first version of the virtual machine in the source computing environment to target virtual networks in the target computing environment;
generate pod configuration data based on the second configuration data, the pod configuration data being for configuring a container pod in the target computing environment;
configure and deploy the container pod in the target computing environment in accordance with the pod configuration data, the container pod being configured to have access to the target virtual disks and the target virtual networks; and
subsequent to the container pod being configured to have access to the target virtual disks and the target virtual networks, configure and deploy the second version of the virtual machine within the container pod in accordance with the second configuration data, the second version of the virtual machine being configured to have access to the target virtual disks and the target virtual networks.

18. The non-transitory computer-readable medium of claim 17, further comprising program code that is executable by the processor for causing the processor to:
generate the disk mapping based on the first configuration data; and
generate the second configuration data based on the disk mapping.

19. The non-transitory computer-readable medium of claim 18, further comprising program code that is executable by the processor for causing the processor to:
generate the network mapping based on the first configuration data; and
generate the second configuration data based on the network mapping.

20. The non-transitory computer-readable medium of claim 17, wherein the source computing environment is not a cloud computing environment and the target computing environment is a cloud computing environment.

* * * * *